(12) United States Patent
Croak et al.

(10) Patent No.: US 8,306,190 B2
(45) Date of Patent: *Nov. 6, 2012

(54) METHOD AND APPARATUS FOR ENABLING COMMUNICATIONS ASSISTANCE FOR LAW ENFORCEMENT ACT SERVICES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/625,465

(22) Filed: Nov. 24, 2009

(65) Prior Publication Data

US 2010/0074425 A1 Mar. 25, 2010

Related U.S. Application Data

(63) Continuation of application No. 11/019,703, filed on Dec. 22, 2004, now Pat. No. 7,626,980.

(51) Int. Cl.
*H04M 1/24* (2006.01)
*H04L 12/66* (2006.01)
(52) U.S. Cl. .......................................... 379/35; 370/352
(58) Field of Classification Search .... 379/32.01–32.05, 379/35; 370/352
See application file for complete search history.

(56) References Cited

U.S. PATENT DOCUMENTS

| | | | |
|---|---|---|---|
| 6,131,032 A * | 10/2000 | Patel | 455/445 |
| 6,434,226 B1 * | 8/2002 | Takahashi | 379/201.01 |
| 6,563,797 B1 * | 5/2003 | Kung et al. | 370/252 |
| 6,614,781 B1 | 9/2003 | Elliott et al. | |
| 6,987,849 B2 | 1/2006 | Ravishankar | |
| 7,006,508 B2 | 2/2006 | Bondy et al. | |
| 7,027,398 B2 * | 4/2006 | Fang | 370/235 |
| 7,055,174 B1 | 5/2006 | Cope et al. | |
| 7,197,010 B1 | 3/2007 | Berstein et al. | |
| 7,209,473 B1 | 4/2007 | Mohaban et al. | |
| 7,260,419 B2 * | 8/2007 | Lee | 455/566 |
| 7,626,980 B1 | 12/2009 | Croak et al. | |
| 2002/0051518 A1 * | 5/2002 | Bondy et al. | 379/35 |
| 2003/0110292 A1 | 6/2003 | Takeda et al. | |
| 2003/0190032 A1 * | 10/2003 | Ravishankar | 379/229 |
| 2003/0219103 A1 * | 11/2003 | Rao et al. | 379/32.05 |
| 2004/0165709 A1 | 8/2004 | Pence et al. | |
| 2004/0219911 A1 * | 11/2004 | Kouchri et al. | 455/423 |
| 2004/0266410 A1 * | 12/2004 | Sand et al. | 455/414.4 |
| 2005/0063544 A1 | 3/2005 | Uusitalo et al. | |
| 2005/0125543 A1 * | 6/2005 | Park et al. | 709/227 |
| 2005/0175156 A1 * | 8/2005 | Afshar et al. | 379/35 |
| 2006/0274660 A1 | 12/2006 | Da Palma et al. | |

OTHER PUBLICATIONS

Fransen, Lawful Interception for IP Networks, SAFE-NL, 18 pages, Nov. 2002.
Skrobo et al., Distributed System for Lawful Interception in VoIP Networks, EUROCON 2003, 5 pages, 2003.

* cited by examiner

*Primary Examiner* — Fan Tsang
*Assistant Examiner* — Solomon Bezuayehu

(57) ABSTRACT

The present invention enables packet-switched network providers, e.g., VoIP network providers, to use commonly deployed components and capabilities to support surveillance services, e.g., CALEA services. Specifically, signaling and media streams that flow through Border Elements can be forked and simultaneously redirected to a surveillance server, a CALEA Server in addition to the terminating endpoint. Additionally, a Media Server (MS) can unobtrusively join a third leg to a communication media path between the CALEA Server and the two, calling party and called party, endpoints. A CALEA Server provides the ability to identify and collect content of voice telephone calls traversing the VoIP Network, as mandated by the Communications Assistance for Law Enforcement Act.

17 Claims, 5 Drawing Sheets

METHOD AND APPARATUS FOR ENABLING COMMUNICATIONS ASSISTANCE FOR LAW ENFORCEMENT ACT SERVICES

This application is a continuation of U.S. application Ser. No. 11/019,703, filed Dec. 22, 2004, now U.S. Pat. No. 7,626,980 B1, which is herein incorporated by reference in its entirety.

The present invention relates generally to communication networks and, more particularly, to a method and apparatus for enabling CALEA services in packet switched networks, i.e. Voice over Internet Protocol (VoIP) networks.

BACKGROUND OF THE INVENTION

Increasingly providers of network services are expected to conform to some provisions of established regulatory practices associated with providing residential phone services. One important such service capability is Communications Assistance for Law Enforcement Act (CALEA), the ability for law enforcement agencies to unobtrusively receive real time access to call setup information between two endpoints, and with less frequency, listen to conversations occurring between two endpoints.

Therefore, a need exists for a method and apparatus for enabling CALEA services in packet-switched networks, e.g., VoIP networks.

SUMMARY OF THE INVENTION

In one embodiment, the present invention enables VoIP network providers to use commonly deployed components and capabilities to support CALEA services. Specifically, signaling and media streams that flow through Border Elements can be forked and simultaneously redirected to the CALEA Server in addition to the terminating endpoint. Additionally, a Media Server (MS) can unobtrusively join a third leg to a communication media path between the CALEA Server and the two, calling party and called party, endpoints. A CALEA Server provides the ability to identify and collect content of voice telephone calls traversing the VoIP Network, as mandated by the Communications Assistance for Law Enforcement Act. A Media Server (MS) is a special server that typically handles and terminates media streams, and to provide services such as announcements, bridges, transcoding, and Interactive Voice Response (IVR) messages.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
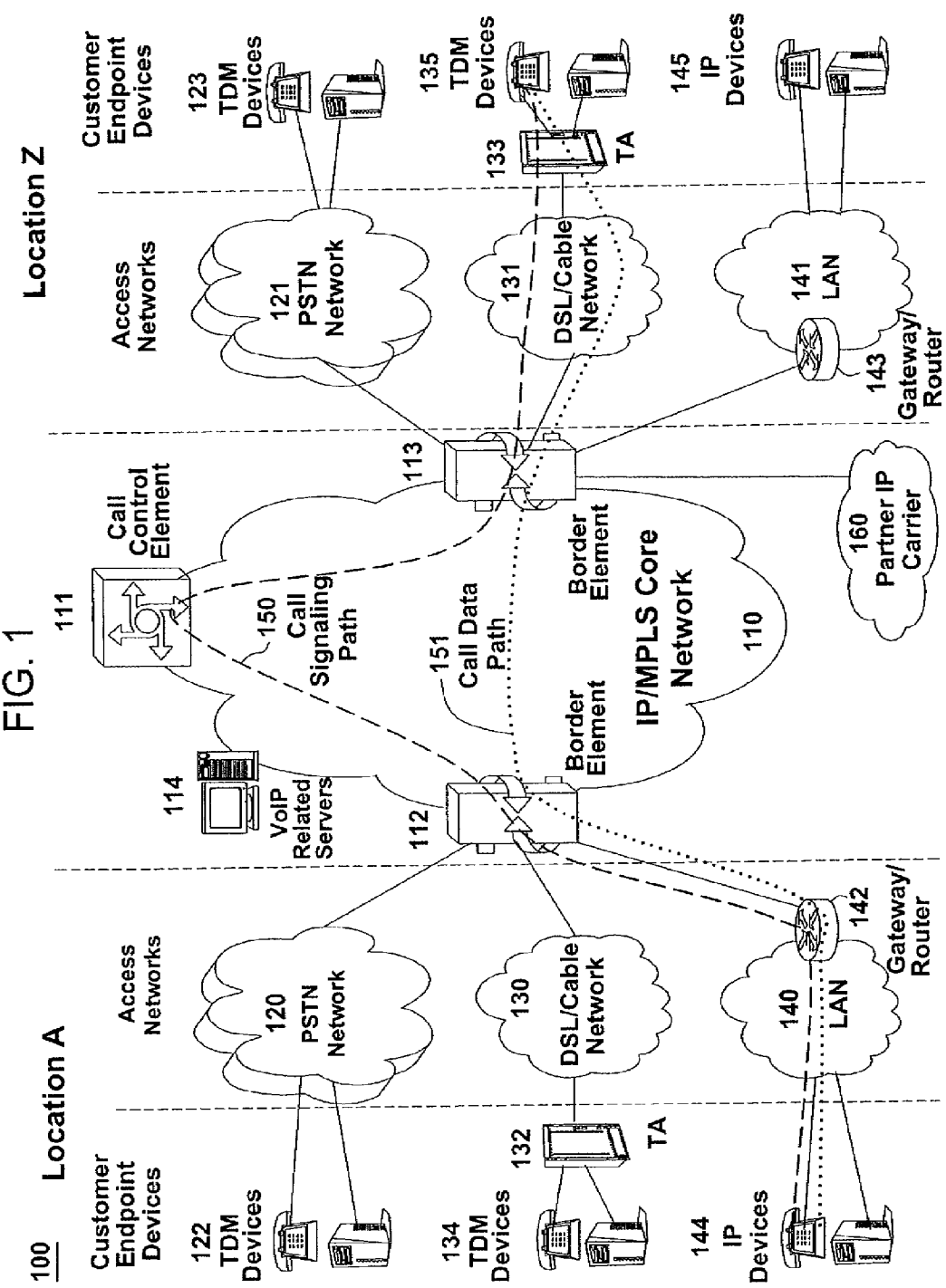
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Increasingly providers of network services are expected to conform to some provisions of established regulatory practices associated with providing residential phone services. One important such service capability is Communications Assistance for Law Enforcement Act (CALEA), the ability for law enforcement agencies to unobtrusively receive real time access to call setup information between two endpoints, and with less frequency, listen to conversations occurring between two endpoints.

To address this need, the present invention enables packet-switched network providers, e.g., VoIP network providers, to use commonly deployed components and capabilities to support CALEA services. Specifically, signaling and media streams that flow through Border Elements can be forked and simultaneously redirected to the CALEA Server in addition to the terminating endpoint. Additionally, a Media Server (MS) can unobtrusively join a third leg to a communication media path between the CALEA Server and the two, calling party and called party, endpoints. A CALEA Server provides the ability to identify and collect content of voice telephone calls traversing the VoIP Network, as mandated by the Communications Assistance for Law Enforcement Act. A Media Server (MS) is a special server that typically handles and terminates media streams, and to provide services such as announcements, bridges, transcoding, and Interactive Voice Response (IVR) messages.

Figure 2:
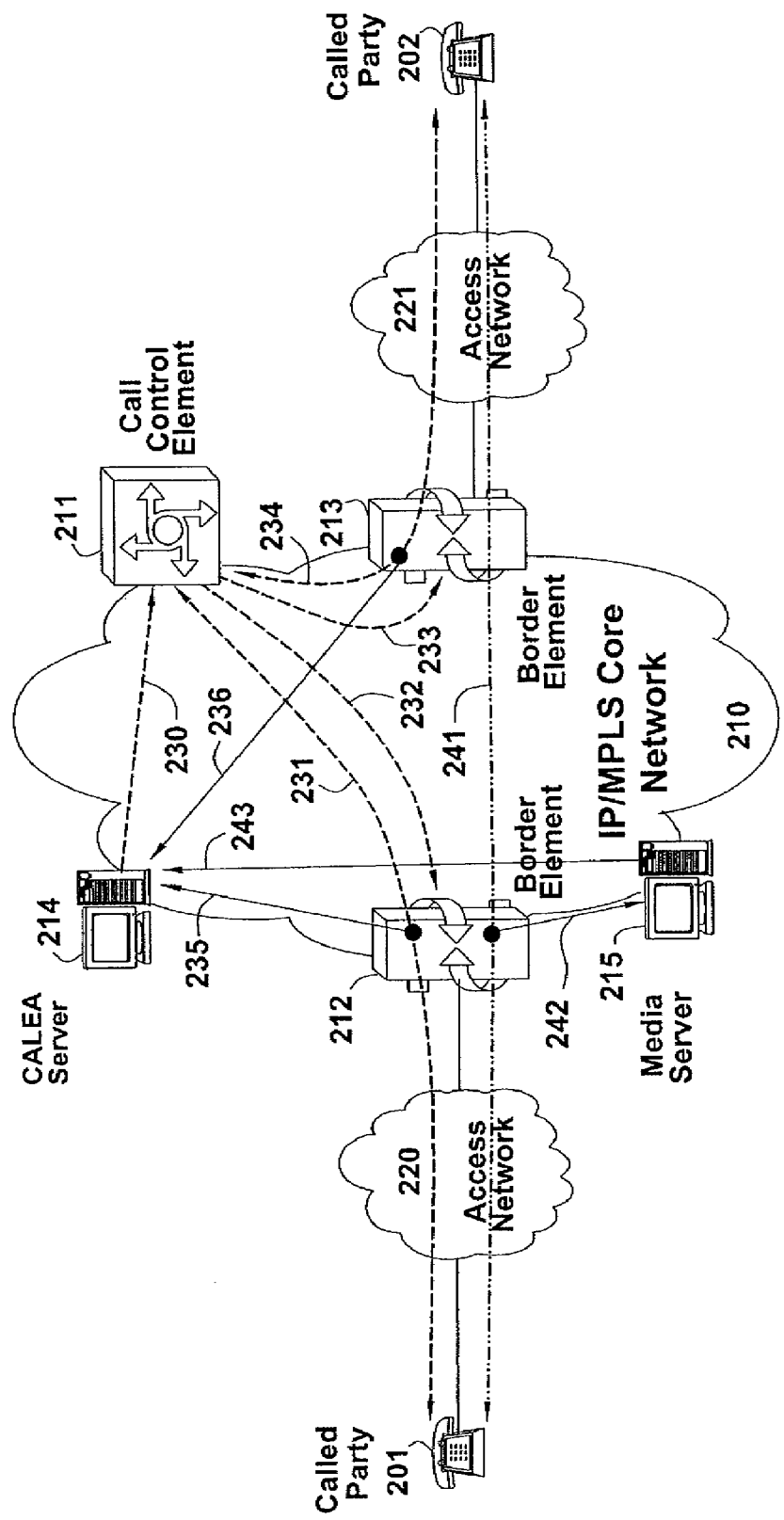
FIG. 2 illustrates an example of enabling CALEA services in a VoIP network of the present invention.

FIG. 2 illustrates an example of enabling CALEA services in a VoIP network. In FIG. 2, calling party 201 places a call to called party 202. CALEA Server (CS) 214 has previously sent a request using flow 230 to CCE 211 to perform CALEA surveillance for both signaling and media path activities on the phone number of calling party 201. CCE 211 receives the call setup message from calling party 201, via flow 231, and finds out that the calling party has been placed on the CALEA surveillance list. CCE 211 then instructs BE 212 and BE 213, via flow 232 and flow 233 respectively, to request the needed CALEA functions, including surveillance of both signaling and media path activities, to be activated for this phone call between calling party 201 and called party 202. CCE 211 then continues to progress the call setup message via flow 234 to called party 202 without either party being aware of the CALEA functions being performed. Upon receiving the CALEA instructions from CCE 211, BE 212 and BE 213 activate the requested CALEA functions for the call. More particularly, for signaling surveillance, BE 212 and BE 213 forks all call setup related signaling messages carried by flow 231 and flow 234 using flow 235 and flow 236 respectively to CS 214. In addition, the original call setup message originated by calling party 201 will be processed and sent to called party 202 without either party being aware of the CALEA functions being performed. When the call is setup between the called party 202 and the calling party 201, media path 241 will be used to transport the conversation media streams. For media path surveillance, BE 212 forks the media path conversation media stream to MS 215 to fulfill the CALEA media path surveillance request. MS 215 bridges a call leg from BE 212 to CS 214 to perform media path surveillance functions. More particularly, MS 215 bridges call leg 242 comprising the conversation media stream of calling party 201 and called party 202 and call leg 243 with CS 214 together so that media streams exchanged between the calling and the called parties can be monitored by the CS 214. Typically, call leg 243 will be setup as listen-only mode. The conversations between the calling and the called parties can occur without either party being aware of the CALEA functions being performed.

Figure 3:
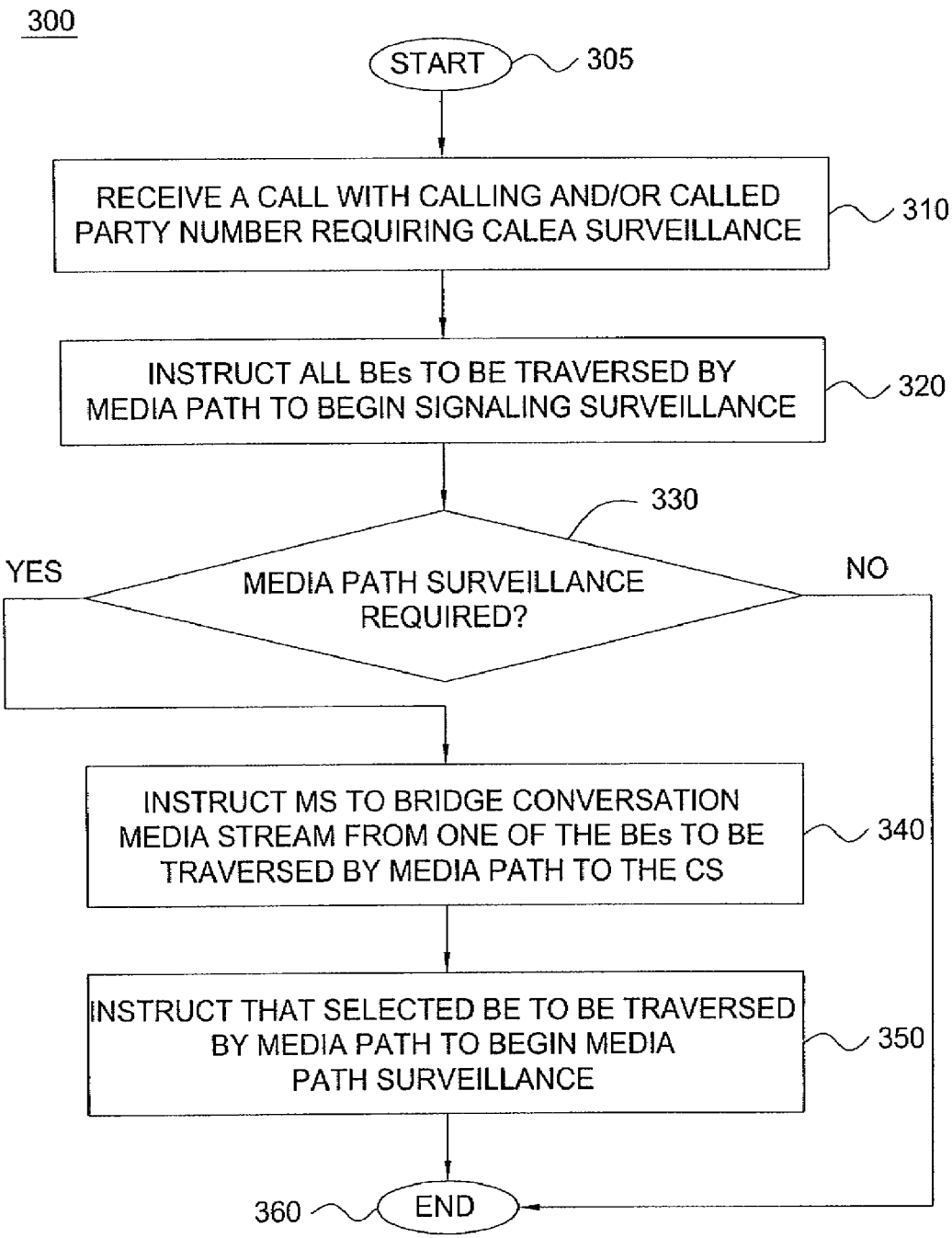
FIG. 3 illustrates a flowchart of a method for enabling CALEA services in a VoIP network by a Call Control Element of the present invention.

FIG. 3 illustrates a flowchart of a method for enabling CALEA services in a VoIP network, e.g., by a Call Control Element. Method 300 starts in step 305 and proceeds to step 310.

In step 310, the method receives a call with the calling party number and/or the called party number requiring CALEA surveillance. The CALEA surveillance is specified by either the calling party number, or the called party number, or both. For example, the network receives the call setup message and determines whether the calling party number, or the called party number, or both phone numbers are on a surveillance list, thereby requiring surveillance to be performed.

In step 320, the method instructs the BEs that are to be traversed by the media path to be setup for the call to begin signaling surveillance functions. In step 330, the method checks if media path surveillance is also requested for the call. If media path surveillance is also requested for the call, the method proceeds to step 340; otherwise, the method proceeds to step 350. In step 340, the method instructs the MS to bridge the conversation media stream forked from one of the BEs that is to be traversed by the media path to the CS. Note that the CS call leg is setup in a listen-only mode so that unobtrusive surveillance can be carried out while conversations between the calling and the called parties are conducted as usual. In step 350, the method instructs that same BE that is to be traversed by the media path to be setup for the call to begin media path surveillance functions. The method ends in step 360.

Figure 4:
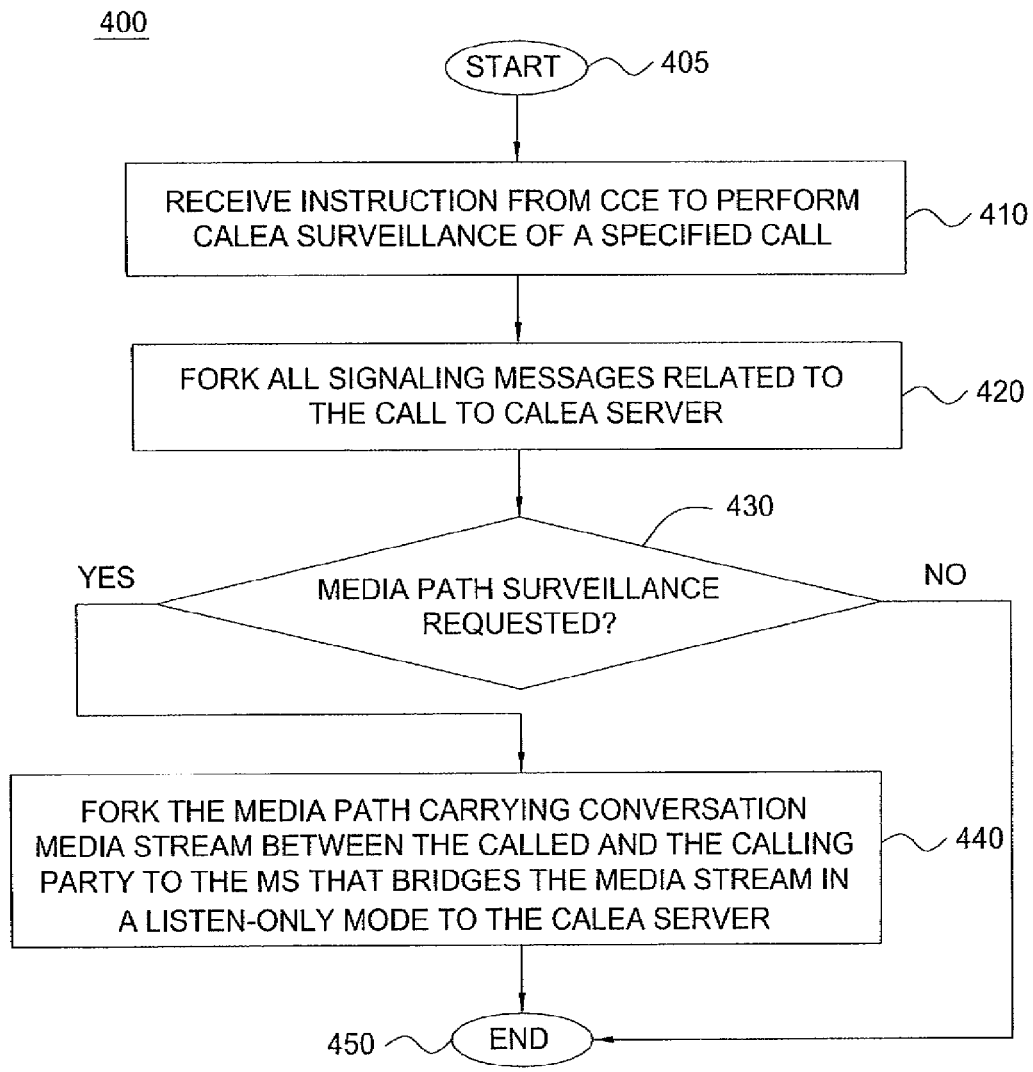
FIG. 4 illustrates a flowchart of a method for enabling CALEA services in a VoIP network by a Border Element of the present invention.

FIG. 4 illustrates a flowchart of a method for enabling CALEA services in a VoIP network, e.g., by a Border Element. Method 400 starts in step 405 and proceeds to step 410.

In step 410, the method receives instructions from the CCE to perform CALEA surveillance for a phone call associated with a specific calling party number and a specific called party number. In step 420, the method unobtrusively forks all call setup related signaling messages to the CS while the original call setup related signaling messages are being processed by the network as usual. In step 430, the method checks if media path surveillance is also requested for the call. If media path surveillance is requested, the method proceeds to step 440; otherwise, the method proceeds to step 450. In step 440, the method forks the conversation media stream to the MS so that the conversation media stream can be directed to the CS for surveillance. The method ends in step 450.

Figure 5:
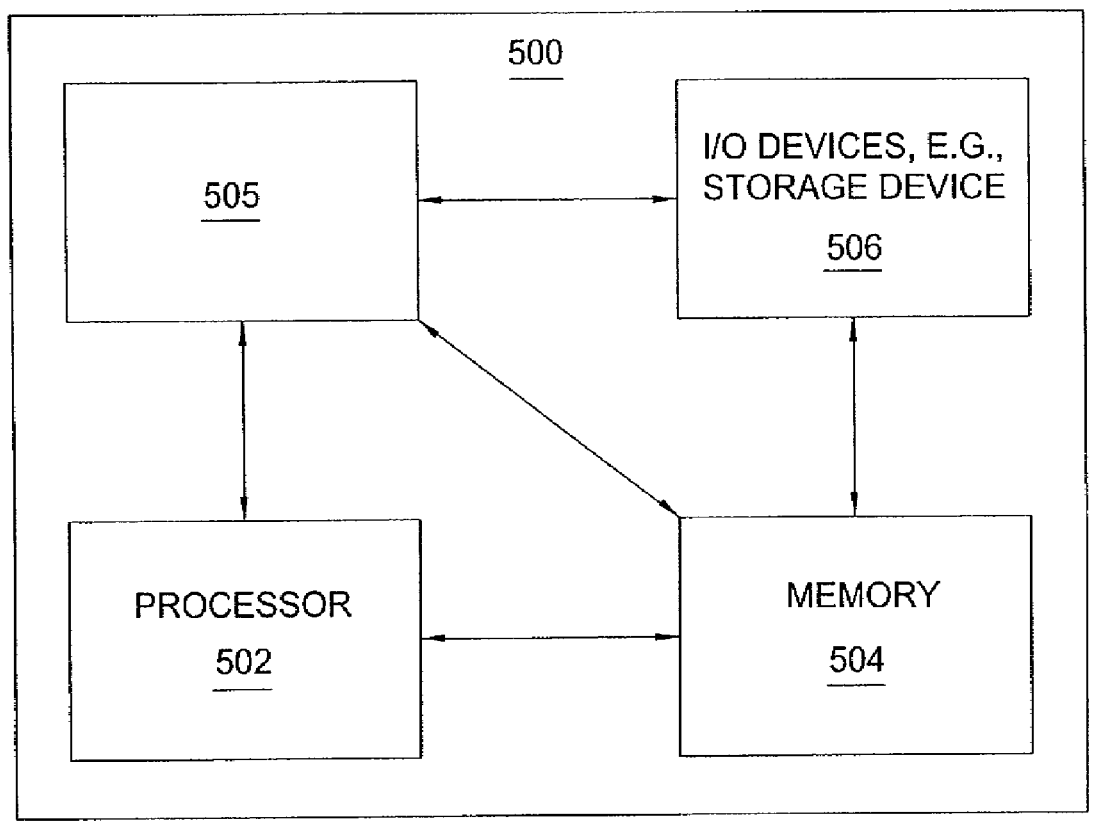
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a CALEA service module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present CALEA service module or process 505 can be loaded into memory 504 and executed by processor 502 to implement the functions as discussed above. As such, the present CALEA service process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a surveillance service in a communication network, comprising:
   receiving a call setup message for a call with a calling party number and a called party number;
   determining whether at least one of: the calling party number or the called party number requires surveillance; and
   performing surveillance on the call if surveillance is determined to be required, wherein the performing comprises:
      instructing a border element to be traversed by a first media path for the call to simultaneously fork a portion of the call to a second media path at a time of receiving the call setup message if surveillance is determined to be required, wherein the instructing the border element to fork the portion of the call is for forking the call setup message via the second media path to a surveillance server.

2. The method of claim 1, wherein the communication network is a voice over internet protocol network.

3. The method of claim 1, wherein the determining comprises:
   determining whether at least one of: the calling party number or the called party number is registered on a surveillance list.

4. The method of claim 1, wherein the portion of the call further comprises conversation media data on the first media path associated with the call.

5. The method of claim 1, wherein the instructing the border element to fork the portion of the call is further for forking a conversation media stream on the first media path via the second media path to a media server to be bridged to the surveillance server.

6. The method of claim 1, wherein the border element is instructed by a call control element.

7. A non-transitory computer-readable medium having stored thereon a plurality of instructions, the plurality of instructions including instructions which, when executed by a processor, cause the processor to perform a method for providing a surveillance service in a communication network, comprising:
   receiving a call setup message for a call with a calling party number and a called party number;
   determining whether at least one of: the calling party number or the called party number requires surveillance; and
   performing surveillance on the call if surveillance is determined to be required, wherein the performing comprises:
      instructing a border element to be traversed by a first media path for the call to simultaneously fork a portion of the call to a second media path at a time of receiving the call setup message if surveillance is determined to be required, wherein the instructing the border element to fork the portion of the call is for forking the call setup message via the second media path to a surveillance server.

8. The non-transitory computer-readable medium of claim 7, wherein the communication network is a voice over internet protocol network.

9. The non-transitory computer-readable medium of claim 7, wherein the determining comprises:
   determining whether at least one of: the calling party number or the called party number is registered on a surveillance list.

10. The non-transitory computer-readable medium of claim 7, wherein the portion of the call further comprises conversation media data on the first media path associated with the call.

11. The non-transitory computer-readable medium of claim 7, wherein the instructing the border element to fork the portion of the call is further for forking a conversation media stream on the first media path via the second media path to a media server to be bridged to the surveillance server.

12. The non-transitory computer-readable medium of claim 7, wherein the border element is instructed by a call control element.

13. A system for providing a surveillance service in a communication network, comprising:
   a processor; and a computer-readable medium in communication with the processor, the computer-readable medium has stored thereon a plurality of instructions, the plurality of instructions including instructions which, when executed by a processor, cause the processor to perform a method, comprising:

receiving a call setup message for a call with a calling party number and a called party number;

determining whether at least one of: the calling party number or the called party number requires surveillance; and performing surveillance on the call if surveillance is determined to be required, wherein the performing comprises:

instructing a border element to be traversed by a first media path for the call to simultaneously fork a portion of the call to a second media path at a time of receiving the call setup message if surveillance is determined to be required, wherein the instructing the border element to fork the portion of the call is for forking the call setup message via the second media path to a surveillance server.

14. The system of claim 13, wherein the communication network is a voice over internet protocol network.

15. The system of claim 13, wherein the determining comprises:

determining whether at least one of: the calling party number or the called party number is registered on a surveillance list.

16. The system of claim 13, wherein the portion of the call further comprises conversation media data on the first media path associated with the call.

17. The system of claim 13, wherein the instructing the border element to fork the portion of the call is further for forking a conversation media stream on the first media path via the second media path to a media server to be bridged to the surveillance server.

* * * * *